Figure 1:
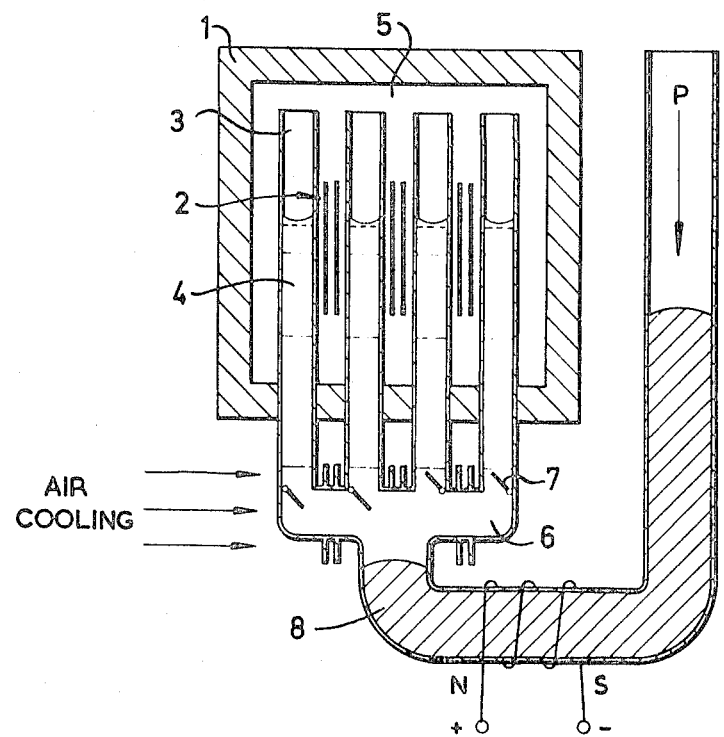

United States Patent

[11] 3,620,315

| [72] | Inventor | Gilbert Northcott Walton<br>Abingdon, England |
|---|---|---|
| [21] | Appl. No. | 725,678 |
| [22] | Filed | May 1, 1968 |
| [45] | Patented | Nov. 16, 1971 |
| [73] | Assignee | United Kingdom Atomic Energy Authority<br>London, England |

[54] NUCLEAR REACTOR WITH OSCILLATING LIQUID COOLANT MODERATOR
14 Claims, 9 Drawing Figs.

[52] U.S. Cl. .................................................. 176/20,
176/26, 176/39, 176/50, 176/64, 310/11, 60/53,
60/56
[51] Int. Cl. .................................................. G21c 7/32
[50] Field of Search .......................................... 176/39, 36,
22, 26, 20, 50, 64; 310/11

[56] References Cited
UNITED STATES PATENTS

| 3,140,411 | 7/1964 | Oickle, Jr. et al. | 176/39 |
| 3,258,405 | 6/1966 | Silvers | 176/65 |
| 3,261,755 | 7/1966 | Mostert | 176/26 |
| 3,284,312 | 11/1966 | West | 176/22 |
| 3,447,321 | 6/1969 | Romero | 176/39 X |

OTHER REFERENCES

Soviet Journal of Atomic Energy, Vol. 5, No. 6, Dec. 1958 " A Pulsing Reactor" by T. N. Zubarev. pp. 1533, 1534, 1535

*Primary Examiner*—Reuben Epstein
*Attorney*—Larson, Taylor and Hinds

ABSTRACT: A nuclear reactor having a negative temperature coefficient of reactivity and having coolant moderator means wherein as the temperature of the core decreases below a mean value more cooling effect is applied to the core and as the temperature of the core increases above said mean value less cooling effect is applied to the core, whereby the reactivity of the core undergoes a sustained self-excited oscillation and the temperature also oscillates about said mean value.

$N_m/N_u$ IS THE RATIO OF THE NUMBER OF ATOMS OF THE MODERATOR TO THE NUMBER OF ATOMS OF URANIUM.

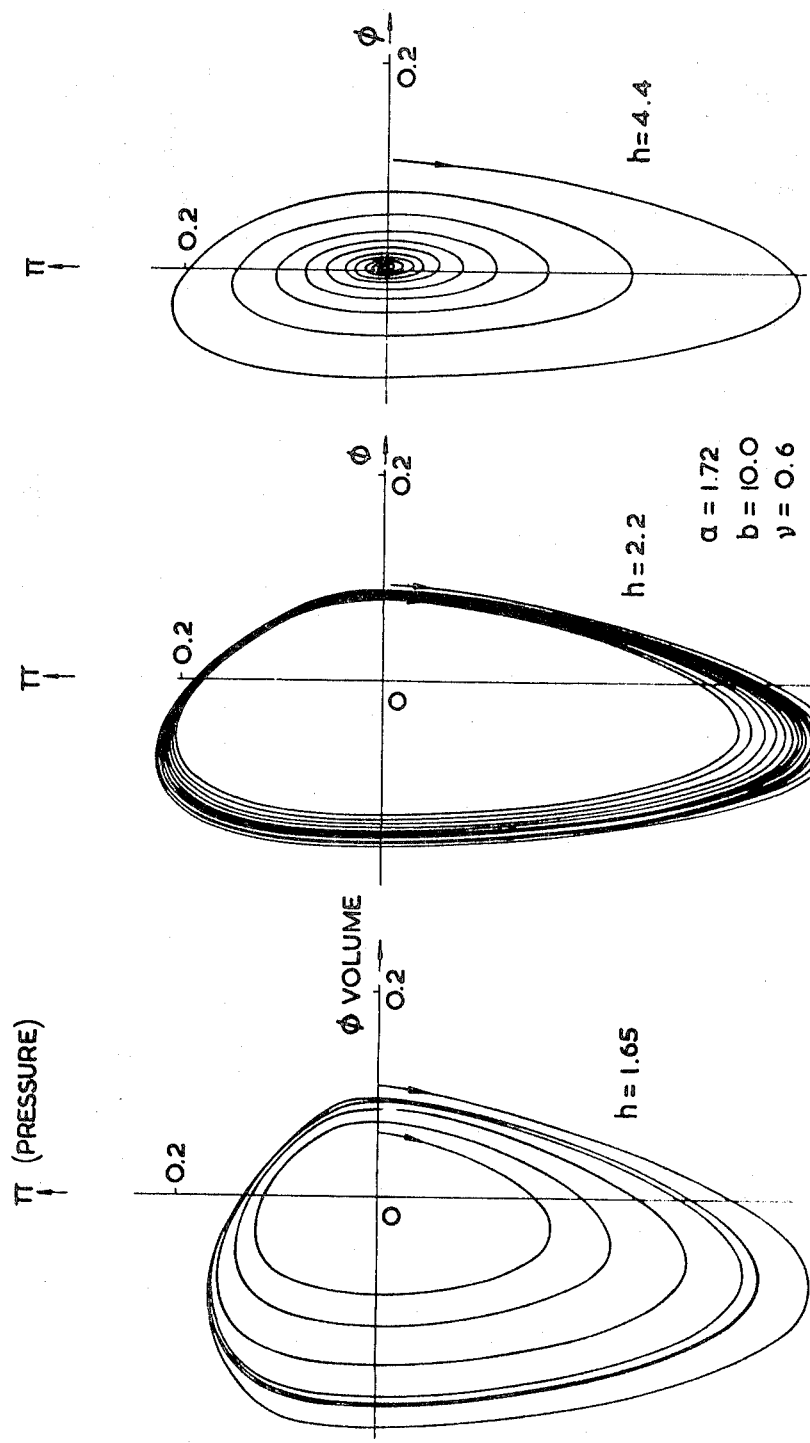
FIG. 4. CONDITION FOR LIMIT CYCLE

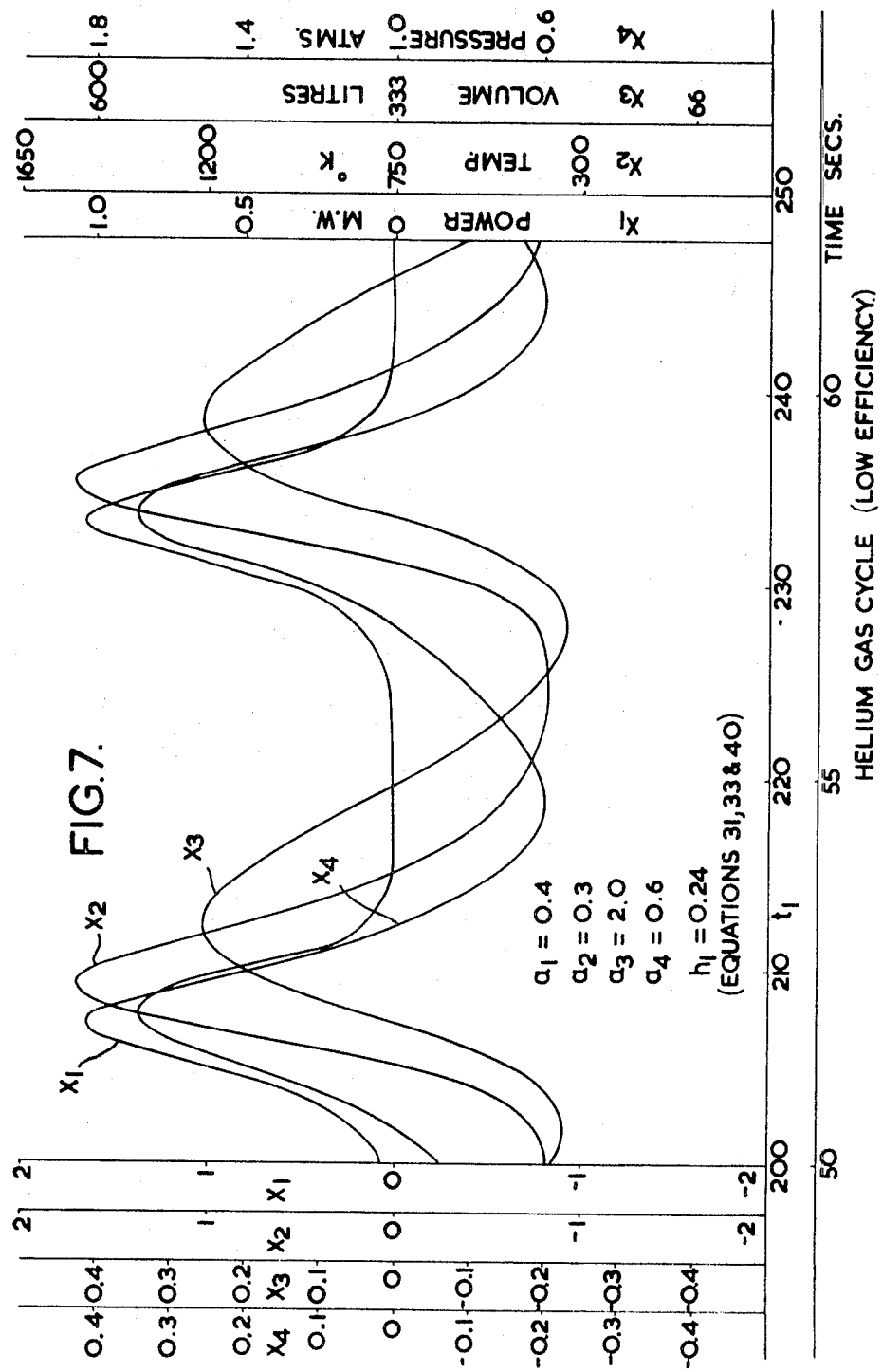

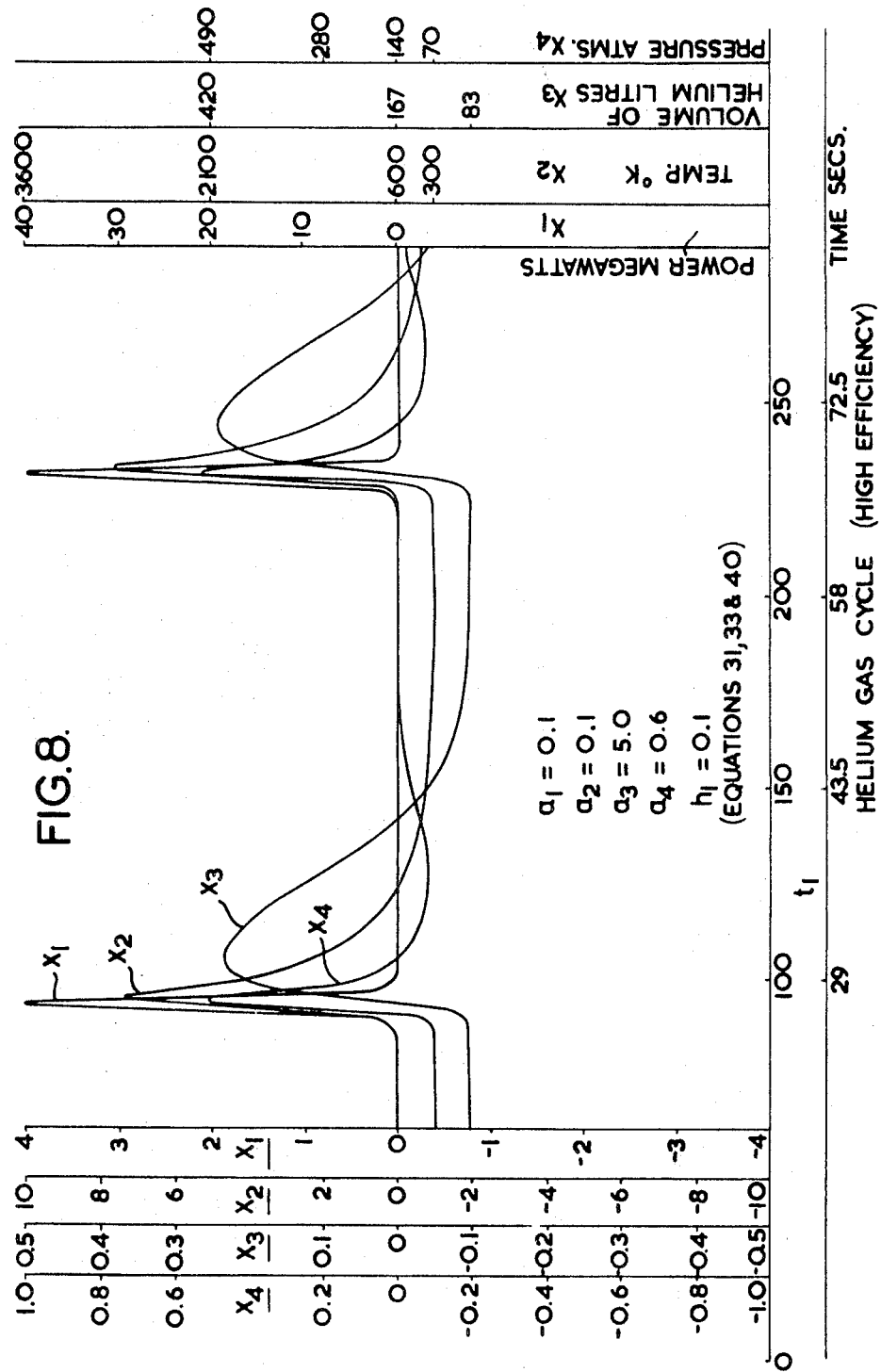

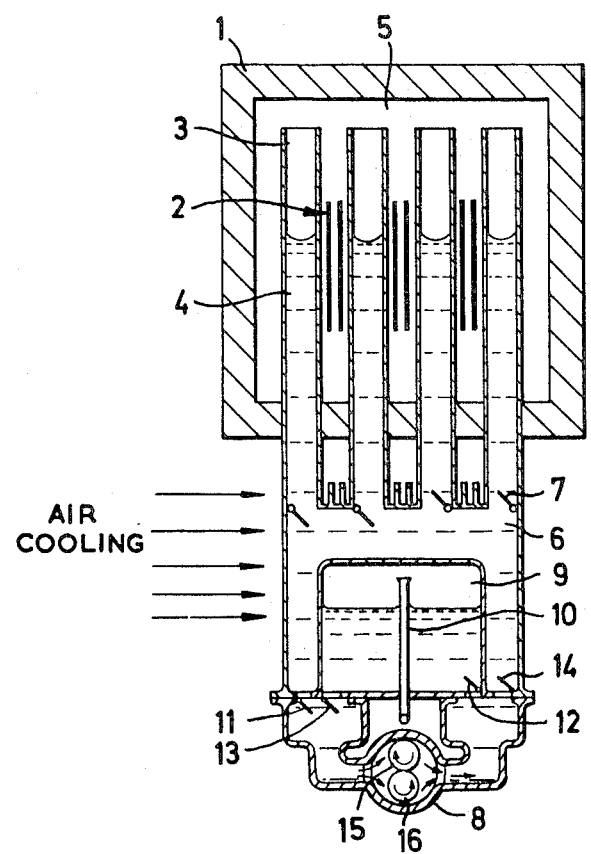

NUCLEAR REACTOR WITH OSCILLATING LIQUID COOLANT MODERATOR

This invention relates to nuclear reactors.

In conventional reactors the use of heat transfer media, particularly gases, introduces penalties in bulk and shielding which in practice nullify the unique power-to-weight ratio of nuclear fuel and in the past, methods of converting reactor power directly into kinetic energy by pulsing the reactor have been studied. A pulsed reactor may prove less efficient in converting heat to work than one which operates a coolant cycle with turbines, but the advantages in containment and bulk can offset the loss in efficiency.

The pulsation of a reactor has been discussed previously by Ergen and Weinberg('Some Aspects of Nonlinear Reactor Dynamics' by W. K. Ergen and A. N. Weinberg, Physics, Vol. 20, p. 413, 1954). Their object was to establish reactor stability and they were able to show that the oscillation of a reactor which cooled more rapidly as it became hotter (i.e. in conformity with Newton's law of cooling) would always be damped.

According to the present invention a nuclear reactor having a negative temperature coefficient has a coolant moderator means wherein as the temperature of the core decreases below a mean value more cooling effect is applied to the core and the reactivity of the core is increased and vice versa, whereby the reactivity of the core undergoes a sustained self-excited oscillation and the temperature also oscillates about said mean value.

According to a further feature of the present invention a nuclear reactor comprises a fuel core, a substantially incompressable coolant-moderator associated with the core and a gaseous fluid arranged such that an increase in the temperature of the core expands said gaseous fluid and forces the coolant-moderator away from the core to reduce the reactivity of the core and to decrease the rate of cooling applied to the core, and a decrease in the temperature of the core allows the gaseous fluid to contract and permits the said coolant moderator to return to the core to increase the rate of cooling applied to said core whereby the reactivity of the core undergoes a sustained self-excited oscillation.

In one form of the invention the reactor may include helium as the gaseous coolant and water as the moderating fluid. Oscillations of the moderating fluid may be used to operate, or provide, a mechanical movement or if the moderating fluid includes a liquid metal the acceleration of the metal through a magnetohydrodynamic converter could be used to produce alternating current.

One embodiment of the invention will now be described solely by way of example with reference to the accompanying drawings.

Figure 2:
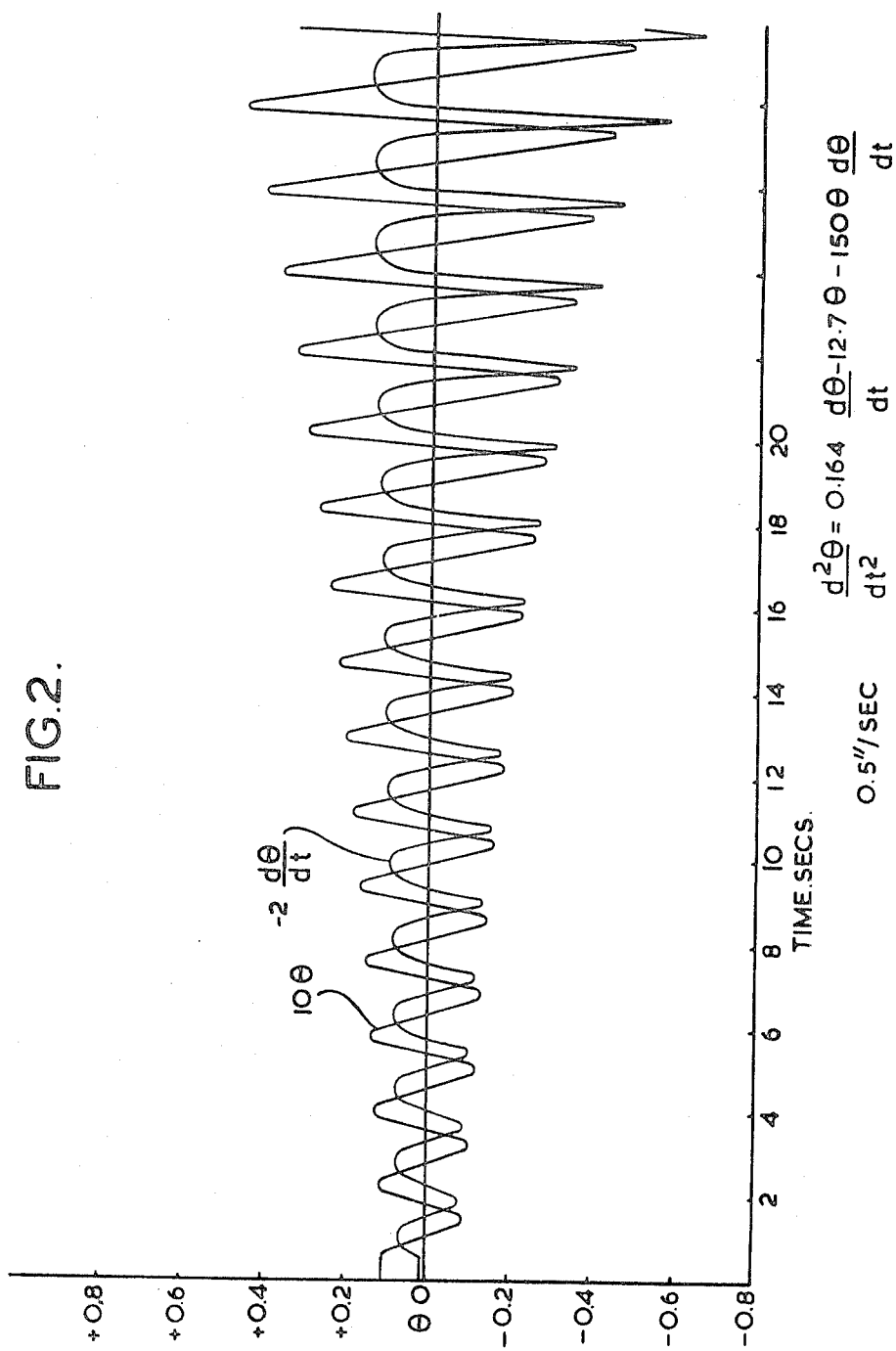
Figure 3:
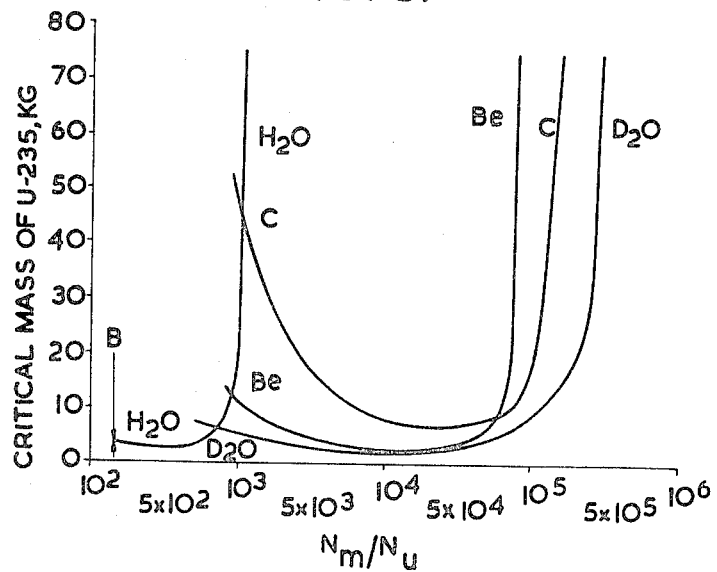
Figure 6:
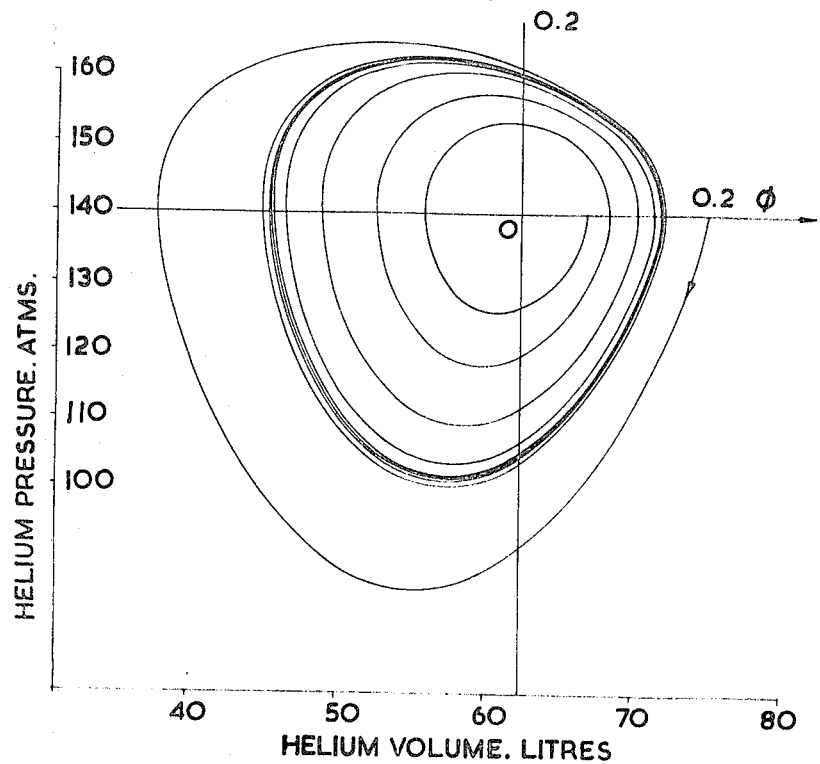
Figure 5:
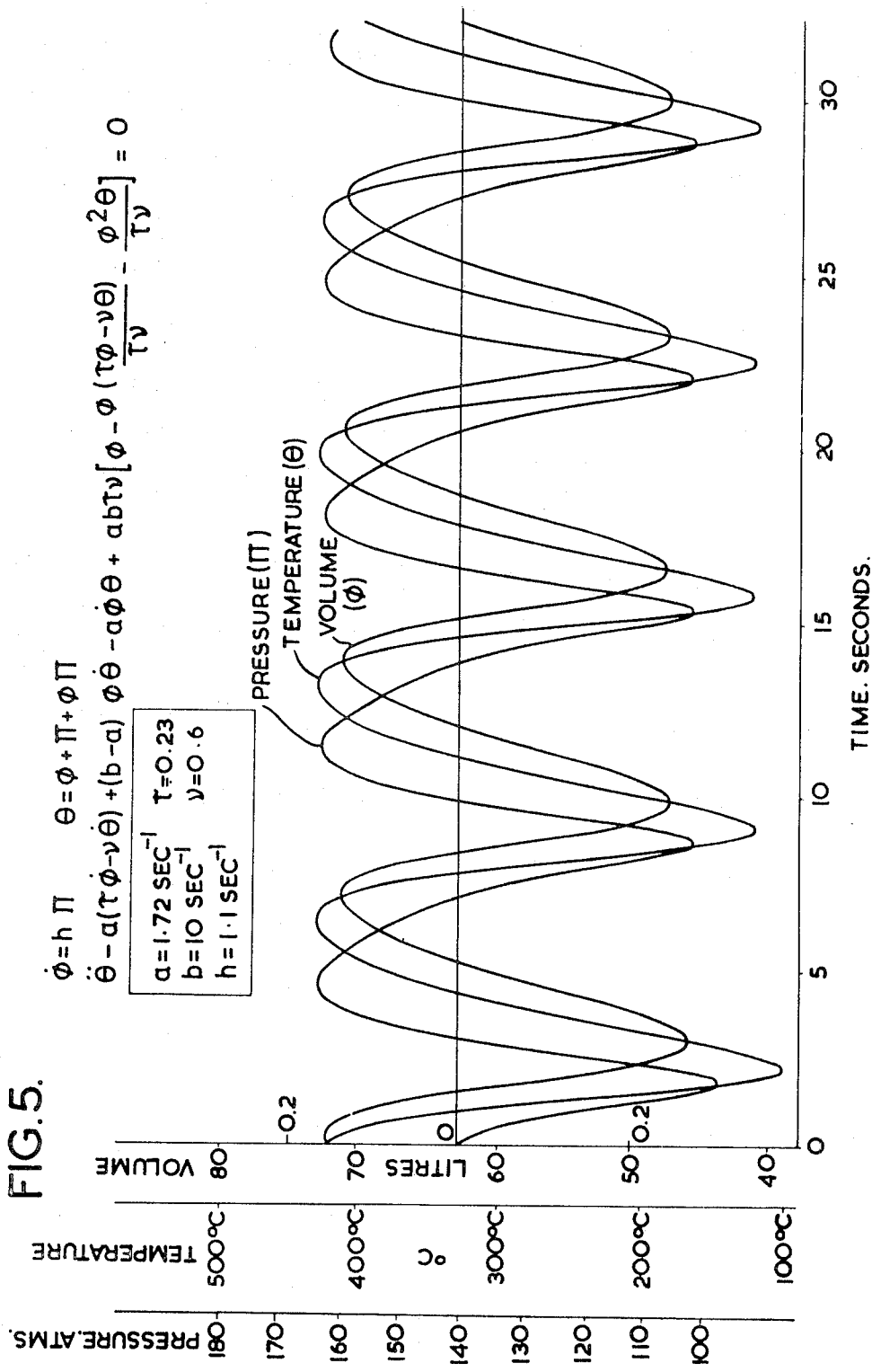

In the drawings:

FIG. 1 is a diagrammatic midsectional view of a nuclear reactor,

FIG. 2 is a diagram showing the temperature cycle of a reactor at constant pressure, FIG. 3 shows the relationship between critical mass and composition, FIG. 4 shows the relationship between pressure and volume for limit cycle, FIG. 5 is a diagram showing the pressure, temperature and volume relationship with time in a reactor helium coolant gas cycle and, FIG. 6 shows the pressure/volume relationship for the same coolant cycle.

FIGS. 7 and 8 show changes in reactor power, and in the helium temperature, volume and pressure as functions of time, and FIG. 9 shows an apparatus similar to the reactor of FIG. 1 for obtaining rotary power.

Referring first to FIG. 1, the reactor comprises a thermally lagged pressure vessel 1 enclosing a nuclear fuel core formed by a plurality of fuel elements 2. The elements are each located within the central void of an annular moderator channel 3 and a fluid moderator 4 is contained in the channel. The upper end of each channel is open and communicates with a gas-filled space 5 above the core. The gas and moderator act as reactor coolants.

The lower ends of the moderator channels are formed into a common manifold and heat sink 6 and the manifold may be provided with external fins for air-cooling purposes. The lower end of each channel is provided with valves 7. An inlet duct 8 connected to the manifold 6 is filled with mercury and the duct forms part of a magnetohydrodynamic converter to produce an alternating electric current.

As the reactor becomes hot, the gas expands, the moderating coolant is blown out of the channels 3, and at the same time the reactor ceases to become critical. As it cools, the coolant and moderator is sucked in and the reactor becomes critical again. If desired the oscillatory movement of the moderating coolant may be utilized to do mechanical work or, the cyclic changes of pressure at P could be converted to mechanical movement.

KINETICS OF THE SYSTEM

1. Notation

| | |
|---|---|
| $N(t)$ | Power of the reactor at time $t$ (watts or calories/sec.) |
| $T(t)$ | Temperature of the gas (°C.) at time $t$ |
| $P$ | Pressure of the gas (atm.) |
| $\rho$ | Effective density of the moderator |
| $M$ | Mass of the gas (gram molecules) |
| $S$ | Specific heat of gas (calories/gram mol. per °C.) |
| $R$ | Gas constant |
| $L$ | Coefficient for transfer of heat from gas to coolant (calories/cm.³ sec.) |
| $V_{tot}$ | Total volume of gas and coolant in reactor core (constant) |
| $V$ | Volume of gas (variable) |
| $k_{ex}=k_{eff}-1$ | Where $k_{eff}$ is the effective multiplication factor (the ratio of the number of thermal neutrons produced for each thermal neutron absorbed in each generation time) |
| $\alpha$ | The inverse of the mean neutron generator time (sec.$^{-1}$) |

2. The Power Equation

When the reactor is close to criticality, the power can be expected to follow:

$$dN/dt = \alpha k_{ex} N \qquad (1)$$

when $k_{ex}$ is zero the reactor is at steady power.

3. Reactivity

We are interested in the dependence of $k_{ex}$ on the density of the gaseous moderator of a solid fuel reactor. It can be shown that for a fissile gas $$k_{ex} = \frac{c'\rho_f - m'}{g'\rho_f + h'} \qquad (2)$$

where $c'$, $m'$, $g'$ and $h'$ are positive constants for the reactor system and $\rho_f$ is the density of the fissile gas. By similar arguments, because the neutron migration area is inversely proportional to the square of the density of the moderator, the reactivity over small changes is dependent on the moderator density $\rho_m$ by $$k_{ex} = \frac{c'(\rho_m)^2 - m}{g(\rho_m)^2} = \frac{c}{g} - \frac{m}{g(\rho_m)^2} \qquad (3)$$

where $c$, $m$ and $g$ are again positive constants for the system in question.

4. The Heat Equation

At any given power the temperature of the core increases, the working gas expands at constant pressure, and its density decreases. If the coolant moderator is carried in channels of uniform width the surface area of the coolant moderator in contact with gas, and therefore the rate of heat transfer, will depend upon the volume of the coolant moderator. If the temperature difference between the coolant moderator and the working gas is kept large, relatively small temperature changes in the gas and coolant moderator will not greatly affect the heat transfer coefficient and the cooling rate may be written $L(V_{tot}-V)$. In these conditions the heat equation is $$P(dV/dt)+MS(dT/dt)=N-L(V_{tot}-V) \quad (4)$$

$P(dV/dt)$ is the work done by the gas on its surroundings; $M(dT/dt)$ is the temperature change in the gas, where S is the specific heat at constant volume. The temperature of the core is assumed to be the same as the working gas and the heat capacity of the core is included in the value of MS. The specific heat of the core and the transfer of heat from the core to the gas is considered later. As there is no change in the mass of the working gas $$PV=MRT \quad (5)$$

and the effective density, $\rho$, of the moderator in the core is given by $$\rho = \left(\frac{V_{tot}-V}{V_{tot}}\right)\rho_m \quad (6)$$

where $\rho_m$ is the actual density of the moderating fluid. At steady power and temperatures, from equation (4)

$$N=L(V_{tot}-V_{eq}) \quad (7)$$

where $V_{eq}$ is the volume of the moderator for steady conditions.

5. Work done by the Reactor

Before equations 1 to 6 can be solved a further relationship has to be established on the way the pressure varies with the volume, because this will control the work done by the gas as it expands and contracts.

In the Carnot cycle a gas expands at a high temperature and contracts by the same amount at a lower temperature, and net work $P(dV)$ is done when the pressure in the expansion is greater than the pressure in the contraction. If a pulsed reactor is coupled to a harmonic oscillator (such as a flywheel and piston) no net work will be done by the reactor if the pressure remains constant through the cycle (i.e. the volume expands and contracts equally as the temperature rises and falls). If the pressure is kept constant and the volume oscillations are allowed to diverge, the rate of doing work is proportional to the rate of divergence. If, under these conditions, the reactor is made to do work i.e. a load is placed on the reactor, so that no divergence occurs, then the pressure will oscillate as in the Carnot cycle.

In the first part of the following description, to avoid the more complicated treatment, the pressure is assumed to remain constant, and the rate of divergence in the oscillation of the temperature (and volume) is calculated. In the second part, the effect of allowing the pressure to oscillate is considered.

6. Approximate Solution

For the purpose of simplicity approximations are made, but it is considered that this will not alter the essential kinetic behavior. In particular equation (3), using equations (5) and (6) is approximated to $$k_{ex}=c(T_{eq}-T) \quad (8)$$

where $c$ is the temperature coefficient of reactivity, and $T_{eq}$ is the temperature for steady power conditions. At constant pressure, from equation (5)

$$P(dV/dt)=MR(dT/dt) \quad (9)$$

Substituting in equation (4)

$$\theta = \frac{T-T_{eq}}{T_{eq}}$$

$$a = \frac{LV_{eq}}{M(S+R)T_{eq}}$$

$$\nu = \frac{V_{tot}-V_{eq}}{V_{eq}}$$

gives $$\frac{d\theta}{dt}=\frac{N}{M(S+R)T_{eq}}+a(\theta-\nu) \quad (10)$$

Differentiating (10) and substituting from (1) and (8) gives $$\frac{d^2\theta}{dt^2}=-\alpha c\theta T_{eq}\left\{\frac{d\theta}{dt}-a(\theta-\nu)\right\}+a\frac{d\theta}{dt}$$

Substituting $b=\alpha c T_{eq}$ and neglecting a term in $\theta^2$, we obtain $$\frac{d^2\theta}{dt^2}-(a-b\theta)\frac{d\theta}{dt}+ab\nu\theta=0 \quad (11)$$

If the term $b\theta\frac{d\theta}{dt}$ is neglected, Equation 11 represents a divergent harmonic oscillator and has a solution $$\theta=\theta_o e^{+\frac{at}{2}}\cos wt \quad (12)$$

where the periodicity is given by $$w^2 = ab\nu - \frac{a^2}{4} \quad (13)$$

and $\theta_o$ is an initial displacement. For small values of $t$, the temperature in each oscillation, and the volume change, is increasing by the value $a/2$ per second, and this therefore represents the rate at which the reactor is doing work on its surroundings.

Equation (11) has been solved on a small EMIAC II analogue computer and it is found that the term $b\theta d\theta/dt$ alters the symmetry of the harmonic oscillation and causes the value of $\theta$ to increase rapidly and decrease slowly (as shown in FIG. 2) providing the value of $b$ is not too large.

NUMERICAL VALUES

Equation (11) shows that the system is improved by having a working gas of low thermal capacity and a coolant of large thermal capacity. In the interest of compactness the moderator should have a high density. Compactness and efficiency are thus best achieved if advantage is taken of the moderating properties of a dense coolant. The following numerical values are obtained for a fully enriched $^{235}$U core using helium as a working gas, cooled and moderated by water. As seen in FIG. 1 changes in the amount of water in the core (i.e. in the effective density of the moderator) will be directly proportional to changes in the absolute temperature of the gas and equation (8) may continue to be applicable for the negative temperature coefficient of reactivity. Helium has the advantage that it can be operated at high temperatures without incurring compatibility problems with the core materials.

FIG. 3 shows the relationship between the mass of $^{235}$U in a bare spherical thermal reactor, and the atom ratio of moderator to uranium at criticality. The most favorable region is shown at point B where an increase in the water-to-uranium ratio causes an increase in reactivity. This suggests that a reactor containing about 3 kg. of $^{235}$U and 34 kg. of water at a density of 1 would be critical.

A cylindrical pressure vessel of 50 cm. diameter and 50 cm. length has a capacity of about 100 liters. This could contain 66 liters of helium at, say, a pressure of 140 atmospheres (2,000 p.s.i.) and 34 liters of water. Under steady conditions a reactor generating 0.5 mw. could maintain the helium at say 1,000° K. and heat the water at a rate 3.4° C. per second. If the water reaches a temperature of 400° K. for the steady state condition, the temperature differential between the helium and water is 600° C. If the water is contained in zirconium piping, only a small area could be exposed to the helium, the rest being lagged. With a thermal conductivity of 0.1 cal./sec. per cm.² of exposed Zr would conduct 0.5 mw. through a temperature differential of 600° C. The mass of 66 liters of helium at 1,000° K. and 140 atmospheres pressure is 448 grams. The mass of pipework etc. could be about 1 kg.

The negative temperature coefficient of a boiling water reactor is known to be of the order $3 \times 10^{-4}$ fractional change in reactivity per ° C. and a similar coefficient would apply to the pressurized helium/water system of the present invention. This figure, however leads to a value of $b$ in equation (11) which is too large. The temperature coefficient may, in practice, be adjusted to any value down to zero by surrounding the reactor with static moderator so that the alteration in moderation caused by the oscillating part is small. The static moderator would preferably be placed outside, or act as, the lagging so that it did not participate in the temperature cycle of the working gas. A value of $C = 3 \times 10^{-5}$ per ° C. is chosen as a suitable value in the present instance.

The inverse of the mean neutron lifetime in a water reactor is of the order $5 \times 10^3$ sec.$^{-1}$ and this figure is taken in the present instance. The number of hydrogen atoms per cm.³ in water is about 25 times the number of helium atoms per cm.³ of gas at 140 atmospheres and it is considered that the helium does not contribute significantly to the moderating or absorbing properties of the water.

From these figures the following parameters may be evaluated.

| | |
|---|---|
| M | 448 grams of He and 4,000 g. of metal core |
| $S_{gas}$ | 1.25 cal./g. °C. (const. pressure) |
| $S_{core}$ | 0.2 cal./g. °C. |
| $T_{eq}$ | 1,000° K. |
| $V_{eq}$ | $6.6 \times 10^4$ cm.³ |
| $V_{tot}$ | $10^5$ cm.³ |
| $\alpha$ | $5 \times 10^3$ sec.$^{-1}$ |
| C | $3 \times 10^{-5}$ per °C. |
| $N_{equil}$ | $1.15 \times 10^5$ cal./sec. |
| L | 3.36 cal./cm.³ sec. |

$$a = \frac{3.36 \times 6.6 \times 10^4}{(4 \times 10^3 \times 0.2 + 448 \times 1.25) \times 1000}$$

$$= 0.164 \text{ sec.}^{-1}$$

$b = 5 \times 10^3 \times 3 \times 10^{-5} \times 1,000$
$= 150 \text{ sec.}^{-1}$
$\nu = 34,000/66,000 \times 0.52$ These numerical values give, for equation (11):

$$\ddot{\theta} - (0.164 - 150\theta)\dot{\theta} + 12.7\theta = 0 \quad (14)$$

With $\theta \times 0.3$, the swept volume $\times 39.6$ liters, increasing at 0.164/2 per second. This corresponds to a work output of $$39.6 \times 0.164/2 \times 140 \times 546/22.4 \times 1.04 \times 10^4 \text{ cal./sec.}$$

giving an efficiency of $$(1.04 \times 10^4/1.15 \times 10^5) \times 9\%$$

FIG. 2 shows the solution of equation (14) as obtained on an analogue computer. The time for one cycle is seen to be about $2\pi/\sqrt{12.7}$, i.e. 1.75 sec. The amplitude is also seen to increase by 0.164/2 per second, i.e. to double in about 12 seconds.

With $\theta = 0.3$ the temperature range of the oscillating gas in the reactor is 1,300° to 700° K. The corresponding oscillation of the temperature of the water in the core is 412° to 388° K. Thus, the temperature oscillations do not greatly alter the temperature differential between gas and water, and the conditions of equation (11) may be maintained. It is further considered that air-cooling is sufficient to keep the water in the heat sink below 388° K. Valves 7 ensure that the oscillation of the water promotes circulation.

The reactor may be controlled by adjustment of the operating pressure. As the pressure at point P is increased from 1 atm., water is forced into the core until it becomes critical, and heat is generated. If the pressure outside the reactor fails, the reactor shuts down. If the pressure inside the reactor fails, the moderator being sufficiently limited in volume ensures that the ingress of mercury as a poison would shut the reactor down. The mercury may also be used to prevent the amplitude becoming too large.

THE STABLE OSCILLATION OF A BRAKED SYSTEM

The above analysis applies to an unbraked system. Before such a system can be used it is necessary to show that a stable oscillation arises when it operates against a resistance. A simple type of resistance may, for the purpose of this analysis, be an orifice plate (not shown) which slows down the movement of the mercury of the reactor illustrated in FIG. 1. A similar resistance, and a resulting electrical current, would arise if the mercury were passed through a magnetic field. Under these circumstances the velocity of the mercury and its acceleration are proportional to the difference in pressure between the two levels (neglecting gravitational effects). The velocity of the mercury is proportional to the rate of change of volume in the helium of the reactor core. The braking effect on the reactor may then be written:

$$(1/h'')(d^2V/dt^2) + (dV/dt) = h'(P - P_{eq}) \quad (15)$$

where $P_{eq}$ is the constant pressure on the outside of the system. $h'$ and $h''$ are proportionality constants. With a pressure difference of the order of, say, 10 atm., the inertial effects of the mercury can be ignored and equation (15) approximates to $$(dV/dt) = h'(P - P_{eq}) \quad (16)$$

In these conditions pressure, volume, and temperature, are three variables which may be represented by:

$$\theta = \frac{T - T_{eq}}{T_{eq}}$$

$$\phi = \frac{V - V_{eq}}{V_{eq}} \quad (17)$$

$$\pi = \frac{P - P_{eq}}{P_{eq}}$$

$P_{eq}$, $V_{eq}$ and $T_{eq}$ are the values when the mercury is stationary. Substituting in PV=MRT, the equation of state is $$\theta = \Phi + \pi + \Phi\pi \quad (18)$$

Equation (16) becomes $$(d\Phi/dt) = h\pi \quad (19)$$

where $h = h'(P_{eq}/V_{eq})$ and has the dimensions, sec.$^{-1}$. When $h$ is large, $\pi$ is very small, and the conditions approximate to the unbraked system. When $\pi$ is small compared to $\Phi$ and $\theta$, $\pi\Phi$ and $(d\pi/dt)$ may be neglected, and from (18) and (19) it follows that $$\Phi = \theta - (1/h)(d\Phi/dt) \quad (20)$$

and by differentiating (18)

$$\Phi = \theta - (1/h)(d\theta/dt) \qquad (21)$$

The reactivity of the system will be proportional to the volume of the moderator in the core, i.e. to the volume of the gas rather than its temperature, and equation (8) is more correctly written:

$$k_{ex} = c'(V_{eq} - V)$$

whence $k_{ex} = -cT_{eq}\Phi \qquad (22)$ where $c = c'(MR/P_{eq})$

In the braked system it is necessary to consider the heat flow in more detail than in the unbraked system. The flow of heat from the helium to the water is dependent on the temperature difference between the helium and the water, as well as on the volume of the water. Thus, equation (4) should be written $$P(dV/dt) + MS(dT/dt) = N - L'(T-T_o)(V_{tot} - V) \qquad (23)$$

where $L'$ is the heat transfer coefficient in cal. per ° C. per cm.$^3$ per second, and $T_o$ is the temperature of the water, which is assumed to be maintained effectively constant. The term $P(dV/dt)$ may be treated as in the unbraked system and further analysis of this term does not appear to alter significantly the kinetics of the system. Equation (23) may not be written $$\frac{d\theta}{dt} = \frac{N}{T_{eq}M(S+R)} - a'(\theta + \tau)(\nu - \phi) \qquad (24)$$

where $$\tau = \frac{T_{eq} - T_o}{T_{eq}}$$

$$\nu = \frac{V_{tot} - V_{eq}}{V_{eq}}$$

$$a' = \frac{L'V_{eq}}{M(S+R)}$$

and Equation 1 is $$\frac{dN}{dt} = -b\phi N \qquad (25)$$

Differentiating (24) and substituting from (25) we obtain $$\ddot{\theta} - a(\tau\dot{\phi} - \nu\dot{\theta}) + (b-a)\phi\dot{\theta} - a\dot{\phi}\theta$$

$$+ ab\tau\nu\left[\phi - \frac{\phi(\tau\phi - \nu\theta)}{\tau\nu} - \frac{\phi^2\theta}{\tau\nu}\right] = 0$$

$$(26)$$

From (18) and (19) $\theta$ and $\phi$ are related by $$\theta = \phi + \frac{(1+\phi)}{h}\dot{\phi} \qquad (27)$$

Using approximation (21), Equation 26 may be put into the form $$\ddot{\theta} - \epsilon_1\dot{\theta} + \epsilon_2\theta^2\dot{\theta} + \epsilon_3\theta\dot{\theta} + \epsilon_4(\dot{\theta})^2 - \epsilon_5\theta(\dot{\theta})^2 + \epsilon_6\left(\theta - \frac{(\tau-\nu)\theta^2}{\tau\nu} - \frac{\theta^3}{\tau\nu}\right) = 0$$

$$(28)$$

where $$\epsilon_1 = \frac{ab\tau\nu}{h} + a(\tau - \nu)$$

$$\epsilon_2 = \frac{2ab}{h}$$

$$\epsilon_3 = b - 2a + \frac{ab}{h}(2\tau - \nu)$$

$$\epsilon_4 = \frac{a-b}{h} - \frac{ab\tau}{h^2}$$

$$\epsilon_5 = \frac{ab}{h}$$

$$\epsilon_6 = ab\tau\nu$$

In numerical applications it is found that terms in $(\dot{\theta})^2$, $\theta(\dot{\theta})^2$, $\theta^2$ and $\theta^3$ may be made small and if these are neglected Equation 28 can be put in the form $$\ddot{\sigma} - \epsilon(1 - \sigma^2)\dot{\sigma} + \lambda\sigma\dot{\sigma} + \sigma = 0 \qquad (29)$$

($\dot{\sigma}$ is here the differentiation of $\sigma$ with respect to $t_1$)

where $$t_1 = \sqrt{\epsilon_6}\, t$$

$$\sigma = \sqrt{\frac{\epsilon_2}{1}} \cdot \theta$$

$$\lambda = \epsilon_3 \sqrt{\frac{\epsilon_1}{\epsilon_2 \epsilon_6}}$$

$$\epsilon = \frac{\epsilon_1}{\sqrt{\epsilon_6}}$$

Equation (29) is a form of the Van der Pol equation as described for instance in "Mathematics of Engineering Systems (Linear and Non-Linear)" by D. F. Lawden, Methuen, 1959, page 328. It has a "limit cycle" corresponding to a stable oscillation of the reactor acting against a resistance. Providing $\epsilon$ is small and $\Lambda$ is not too large, solution of equation (29) is approximately $$\sigma = 2 \cos t_1 \qquad (30)$$

with an amplitude of $\sigma = 2$ and a periodicity of $2\pi$.

In principle equations 18, 19 and 26 may be solved to give $\theta$, $\Phi$ and $\pi$ as functions of time.

The Van der Pol equation (equation (29)) for the limit cycle of a stable oscillation, is an approximation. A complete solution without any approximations follows. This has been done by finding the condition for stability of the steady state condition by analytical methods, and then setting the three equations (18), (19) and (26), on an analogue computer with numerical values for the steady state solution. It is found that when the resistance term, $h$, is altered so that the steady state is unstable, the reactor oscillates with a constant frequency and constant amplitude in a limit cycle. If the amplitude of the limit cycle is disturbed by, for instance, a small transient, it returns to the constant value.

STABILITY OF THE STEADY STATE

The stability of equations (18); (19) and (26) may be tested as described on page 285 of the book "Nonlinear Analysis" by W. J. Cunningham, published by McGraw-Hill, 1958.

The three equations can be put in the forms:

$$\frac{dx_1}{dt_1} = -\frac{1}{a_1}x_1 x_3 \qquad (31)$$

$$\frac{dx_2}{dt_1} = x_1 + a_1(x_2 + 1)(x_3 - 1) \qquad (32)$$

$$\frac{dx_3}{dt_1} = h_1\left(\frac{a_2 x_2 - x_3}{1 + a_3 x_3}\right) \qquad (33)$$

where $$x_1 = \frac{N}{\sqrt{abv\tau} T_{eq}(MS+M'S')} = \frac{a_1 N}{N_{eq}}$$

$$x_2 = \frac{\theta}{\tau}$$

$$x_3 = \frac{\phi}{\nu}$$

(these are positive or negative variables) and $$a_1 = \sqrt{\frac{a}{B}}$$

$$a_2 = \frac{\tau}{\nu}$$

$$a_3 = \nu$$

$$h_1 = \frac{h}{\sqrt{abv}}$$

(these are all positive constants) and $$t_1 = \sqrt{abv}\tau$$

($\pi$ is eliminated from (18) and (19) in (33) and $x_1$ is eliminated from (31) and (32) in (26). Equation (31) corresponds to equation (25), equation (32) corresponds to equation (24), and equation (33) corresponds to equation (27).

$$\frac{dx_1}{dt_1} = \frac{dx_2}{dt_1} = \frac{dx_3}{dt_1} = 0$$

and by definition $x_2 = x_3 = 0$. Under these conditions from (5) $x_1 = a_1$.
Consider small variations $u_1$, $u_2$ and $u_3$ from the stationary condition, such that $$x_1 = a_1 + u_1$$

$$x_2 = u_3$$

$$x_3 = u_3$$

Substituting in (31), (32) and (33) we obtain $$\frac{du_1}{dt_1} = -\frac{1}{a_1}(a_1+u_1)u_3 \quad (34)$$

$$\frac{du_2}{dt_1} = a_1+u_1+a_1(u_2+1)(u_3-1) \quad (35)$$

$$\frac{du_3}{dt_1} = h_1\left(\frac{a_2 u_2 - u_3}{1+a_3 u_3}\right) \quad (36)$$

Now assume the small variations are increasing exponentially with time, i.e. let $$u_1 = U_1 e^{\lambda t_1}, \quad u_2 = U_2 e^{\lambda t_1}, \quad u_3 = U_3 e^{\lambda t_1}$$

where $\lambda$ may be $+ve$ or $-ve$ and $U_1$, $U_2$, etc., are constants. Differentiating, substituting in (34), (35) and (36), neglecting second order terms, and solving, we obtain a cubic in $\lambda$, i.e.

$$\lambda^3 + \lambda^2(h_1+a_1) + \lambda(a_1 h_1 - a_1 a_2 h_1) + a_2 h_1 = 0 \quad (37)$$

The condition of stability is that none of the values of $\lambda$ may be positive, i.e. any disturbance must die away, and not grow. The roots of equation (37) may be found by the Routh-Hurwitz method as given in the book "Nonlinear Analysis" by W. J. Cunningham, published by McGraw-Hill, and for stability it is found that $$a_1(h_1+a_1)(1-a_2)-a_2 \text{ must be } +ve.$$

In our case we require the system to be just unstable, i.e.

$$(h_1+a_1)(1-a_2) \leq \frac{a_2}{a_1}$$

Returning to the symbols of equations (18), (19) and (26), the necessary condition is $$(h_1+a\nu)(\nu-\tau) \leq b\nu\tau \quad (38)$$

THE EFFECT OF PRESSURE ON SPECIFIC HEAT

In the derivation of equation (18) the value of $P(dV/dt)$ was approximated to $MR(dT/dt)$ and differentiated assuming P to be constant (see equation (24)). The value of the specific heat at constant pressure was then used in the numerical examples. To be more consistent, an allowance should be made for the variation of specific heat with pressure and the specific heat at constant volume used for calculations. Substituting for P and V $$P\frac{dV}{dt} = P_{eq}V_{eq}(\pi+1)\frac{d\phi}{dt} \quad (39)$$

$$= MRT_{eq}\left(\frac{1}{h}\frac{d\phi}{dt}+1\right)\frac{d\phi}{dt}$$

Substituting $a_4 = \frac{MR}{MS+M'S'}$

Equation (32) is found to be more correctly represented by $$\frac{a_4}{a_2}\left(\frac{a_3}{h_1}\frac{dx_3}{dt_1}+1\right)\frac{dx_2}{dt_1} + \frac{dx_2}{dt_1} = x_1 + a_1(x_2+1)(x_3-1) \quad (40)$$

The condition for stability, derived using Equation (40) instead of Equation (32) is $$(h_1(a_4+1)+a_1)(1-a_2) \leq \frac{a_2}{a_1} \quad (41)$$

EFFICIENCY

Values for the amplitudes and period of the limit cycle have been obtained by a computer program on Atlas II using numerical values for the constants $a_1$, $a_2$, $a_3$, $a_4$, and $h_1$. Numerical solution of equations (31), (40) and (33) gives values of $x_1$, $x_2$ and $x_3$ as a function of time. The change in pressure may also be calculated. This is given, from equation (19), by $$x_4 = \frac{1}{h_1}\frac{dx_3}{dt_1} \quad (42)$$

where $$x_4 = \frac{\pi}{\mu}$$

The work done by the system in each cycle is $$\text{work per cycle} = \int_0^{t_p} P\frac{dV}{dt} dt \quad (43)$$

where $t_p$ is the period of the cycle. The mean power is given by $$\text{Power} = \frac{1}{t_p}\int_0^{t_p} P\frac{dV}{dt} dt \quad (44)$$

The efficiency, $E_{ff}$, is therefore $$E_{ff} = \text{Power}/N_{eq} \quad (45)$$

Substituting the dimensionless terms into (44), and using Equation (3), $$E_{ff} = \frac{P_{eq}V_{eq}}{N_{eq}t_p}\left[\int_0^{t_p}\frac{1}{h}\left(\frac{d\phi}{dt}\right)^2 dt + \int_0^{t_p}\frac{d\phi}{dt}dt\right] \quad (46)$$

In the limit cycle the volume of the expansion equals the volume of the contraction and therefore $$\int_0^{t_D} \frac{d\phi}{dt} dt = 0 \quad (47)$$

Substituting $a_1$, $a_2$, $a_3$, $a_4$, $h_1$, and $x_4$ into Equation (46) gives $$E_{ff} = h_1 \frac{a_3 a_4}{a_1 a_2} \frac{1}{t_D} \int_0^{t_D} (x_4)^2 dt \quad (48)$$

NUMERICAL TESTS FOR THE BRAKED SYSTEM

Equation (38) was tested on the analogue computer. FIG. 4 shows pressure-volume plots using equations (18), (19), and (26) for the following parameters:

$a = 1.72$
$b = 10$
$\nu = 0.6$
$\tau = 0.23$

With these figures equation (38) has the values shown.

| $h$ | $(h+a\nu)$ | $(\nu-\pi)-b\nu\pi$ |
|---|---|---|
| 4.4 |  | +0.62 |
| 2.2 |  | −0.18 |
| 1.65 |  | −0.38 |
| 1.1 |  | −0.59 |

With $h=4.4$, equation (38) indicates stability and as seen in FIG. 4 there is no limit cycle and the system converges to stability. With $h=2.2$ the system moves very slowly towards a limit cycle. With $h=1.65$ or 1.1, a limit cycle is obtained. As $h$ becomes less, the cycle persists but the frequency becomes slower.

FIGS. 5 and 6 show values derived from equations (26) and (27) for the pressure, temperature and volume of the helium gas during a reactor cycle.

FIGS. 7 and 8 show changes in reactor power, and in the helium temperature, volume, and pressure as functions of time. These solutions have been obtained from equations (31), (33) and (40) by numerical methods using Atlas II. FIG. 7 shows a low-efficiency system which might be designed for experimental study. The following parameters give the values for the helium gas cycle shown.

$N_{eq} = 0.25$ mw.
$V_{tot} = 1,000$ liters
$V_{eq} = 333$ liters (667 liters of water)
$P_{eq} = 1$ atmosphere
$T_{eq} = 750°$ K.
$T_o = 300°$ K.
$M = 21.8$ g. of helium
$M' = 4$ kg.
$S = 0.75$ cal./g. °C.
$S' = 0.2$ cal./g. °C.
$\alpha = 370$ sec.$^{-1}$
$c = 1.8 \times 10^{-5}$ per °C.
$a = 0.8$ sec.$^{-1}$
$b = 5$ sec.$^{-1}$ At atmospheric pressure the efficiency is only about 0.2 percent, giving about 0.7 horsepower. The time of a complete oscillation is about 5.15 sec. The swept volume is 320 liters and the pressure oscillation is from 0.6 atmospheres to 1.5 atmospheres. At 140 atmospheres the same system has an efficiency of about 8 percent and should give about 27 horsepower.

FIG. 8 shows a high-efficiency system using the following parameters.

$N_{eq} = 1$ mw.
$V_{tot} = 1,000$ liters
$V_{eq} = 167$ liters (833 liters of water)
$P_{eq} = 140$ atm.
$T_{eq} = 600°$ K.
$T_o = 300°$ K.
$M = 1,900$ g.
$M' = 4$ kg.
$S = 0.75$ cal./g. °C.
$S' = 0.2$ cal./g. °C.
$\alpha = 370$ sec.$^{-1}$
$c = 2.5 \times 10^{-5}$ per °C.
$a = 0.07$ sec.$^{-1}$
$b = 7$ sec.$^{-1}$ The efficiency of this system is about 38 percent (500 horsepower), and the power pulse produces high temperatures and pressures.

FIG. 7 shows the anticipated behavior of the system. As the temperature drops the moderator is sucked in, the system becomes critical, heat is generated and the temperature and pressure rise. Following the pressure rise the volume increases against a resistance, the system ceases to be critical, and it returns to its previous condition. When the internal pressure equals the external pressure ($x_4 = 0$) the volume ($x_3$) goes through a maximum or minimum.

When $a_1 = 1$ the power, pressure, volume and temperature all follow curves approximating to simple harmonic changes. As $h_1$ becomes smaller the pressure change becomes larger and the volume change smaller. When $a_1 = 0.4$ the parameters correspond to those shown in FIG. 7. When $a_1 = 0.1$ the cycle is very asymmetrical as shown in FIG. 8.

For small initial oscillations the value of $k_{ex}$ will be very small and the periodicity, being controlled by the half-lives of the delayed neutron groups, will be very slow. However, as discussed above, with no resistance, and under constant external pressure, the amplitude will increase. As $k_{ex}$ becomes larger it is believed that the period will become faster ($\alpha$ increases and $b$ in equation (26) increases).

To achieve a limit cycle the reactor must be designed to agree with the equations. The helium pressure does not enter in any major way into the nuclear properties of the system, although it radically affects efficiency. The reactivity of the system is made to alter approximately linearly with the amount of water moderator in accordance with equation (22). This may be done by building concentric cylinders around cylindrical fuel. By altering the relative amounts of static moderator, moving moderator, and core modules at different radii, it is believed that the necessary linear relationship could be approximately established.

The heat flow must be adjusted to meet the unstable stationary condition when $$\pi = \theta = \Phi = 0 \text{ and } N = N_{eq}$$

FIG. 9 shows a diagrammatic cross-sectional view of an apparatus arranged to operate along the lines of the reactor of FIG. 1 to obtain rotary power.

The apparatus employs an oil gear motor 8 of the type developed to generate high power from oil pumped through them under pressure. (Such an oil gear motor is disclosed in the book, "Oil Hydraulic Power and its Industrial Applications" by W. Ernst published by McGraw-Hill). No losses in mechanical efficiency occur in an oil gear motor apart from small losses resulting from friction and the viscosity of the oil. Oils, such as for example terphenyl and Santowax have been developed as reactor moderators and coolants and could be used with the oil gear motor 8.

In operation of the apparatus the pressure in the tank 9 is maintained constant, or nearly constant, through the pressure control tube 10. When the gas in the space 5 expands the moderator coolant fluid is forced via a nonreturn valve 11, through the motor 8, and through a nonreturn valve 12 into the tank 9. When the gas in the space 5 contracts, the moderator coolant flows via the nonreturn valve 13, through the motor 8 and through the nonreturn valve 14 into the channels 3. The flow of the moderator coolant is in one direction and drives the gearwheels 15 and 16 in opposite directions. The power transmitted by the gearwheels is utilized to drive an output shaft or shafts (not shown).

The moderator coolant fluid is aircooled and cools the gas in the space 5. When the pressure in the space 5 and the tank 9 are substantially the same the motor is free to continue circulating the moderator coolant fluid under its own inertia. As the level of the moderator coolant fluid in the channels 3 controls the reactivity of the core of the reactor, the apparatus may be started, stopped or controlled by varying the pressure in the tank 9 to promote movement of the moderator coolant fluid, or by varying the load on the motor 8. The latter method may be achieved by providing an auxiliary power unit to turn the motor 8 when required.

It is to be understood that the oscillatory movement of the moderator coolant may be used to cause alternate ingression and expulsion of water into a water jet propulsion device for the purpose of propelling ships, gaseous cushion supported craft and the like.

I claim:

1. A nuclear reactor having a negative coefficient of reactivity comprising a fuel core in a pressure vessel; a liquid coolant moderator operable on the core to vary the cooling applied to the core and the reactivity of the core; a gas trapped in the pressure vessel at all times during operation of the reactor, and operable on the coolant moderator such that expansion of the gas due to nuclear heating moves the coolant moderator away from the core and thereby simultaneously decreases the reactivity of the core and the amount of cooling applied to the core, and contraction of the gas due to the core cooling causes the coolant moderator to be drawn into the core, to increase the reactivity of the core and increase the amount of cooling applied to the core; means to introduce initially the coolant moderator to the core to render the core critical and thereby start an oscillation of the reactivity and temperature of the core and movement of the coolant moderator into and away from the core which thereafter is a self-excited oscillation, and means to extract heat from the coolant moderator.

2. A nuclear reactor as claimed in claim 1 wherein said gas operates as a coolant.

3. A nuclear reactor as claimed in claim 1 wherein the gas is helium.

4. A nuclear reactor as claimed in claim 1 wherein the coolant moderator is water.

5. A nuclear reactor as claimed in claim 1 wherein the oscillation of the coolant moderator is used to operate mechanical means to do mechanical work.

6. A nuclear reactor as claimed in claim 1 wherein the coolant moderator comprises a liquid metal.

7. A nuclear reactor as claimed in claim 1, further comprising a slug of liquid metal, and means for causing the coolant moderator to operate on the slug of liquid metal to oscillate the liquid metal in a magnetic field to generate electricity.

8. A nuclear reactor as claimed in claim 1, further comprising a hydraulic motor, and nonreturn valves through which the oscillating coolant moderator flows to produce a unidirectional flow to drive the hydraulic motor.

9. A nuclear reactor system according to claim 1, wherein the coolant moderator is contained in a container which extends through a wall of the pressure vessel into the interior of the pressure vessel and the interior of which communicates with the interior of the pressure vessel, the coolant moderator in the container together with the walls of the pressure vessel defining a variable-volume chamber in which the gas is trapped.

10. A reactor as claimed in claim 1, wherein the rate of change of reactivity is maintained proportional to the rate of change of cooling applied to the core by controlling the amount of coolant moderator applied to the core.

11. A nuclear reactor as claimed in claim 1, wherein the mass of the gas is maintained constant during operation of the reactor.

12. A nuclear reactor as claimed in claim 9, wherein the container has a central well in which the core is located, the well being formed by a pair of vertically extending concentric walls spaced to define an annular void which surrounds the core and which communicates with the interior of the pressure vessel, such that the coolant moderator may be moved vertically to surround the core.

13. A nuclear reactor as claimed in claim 12, wherein the container has a central well and one or more concentric annular wells, the wells being formed by a plurality of concentric vertically extending walls which define two or more annular voids in which the coolant moderator is contained, there being nuclear fuel elements positioned in the central well and the annular well so formed.

14. A nuclear reactor as claimed in claim 9, wherein a part of the container forms a reservoir and heat sink.

* * * * *